United States Patent [19]
Haug

[11] Patent Number: 5,823,412
[45] Date of Patent: *Oct. 20, 1998

[54] TWO PIECE CLIP

[75] Inventor: Louis A. Haug, Phelan, Calif.

[73] Assignee: Sport Carriers, Inc., Grand Terrace, Calif.

[*] Notice: This patent issued on a continued prosecution application filed under 37 CFR 1.53(d), and is subject to the twenty year patent term provisions of 35 U.S.C. 154(a)(2).

[21] Appl. No.: 576,032

[22] Filed: Dec. 21, 1995

[51] Int. Cl.⁶ .................................................. B60R 9/00
[52] U.S. Cl. .......................................... 224/329; 224/309
[58] Field of Search .................... 224/329, 331, 224/309, 322

[56] References Cited

U.S. PATENT DOCUMENTS 5,335,836  8/1994  Waddell ............................ 224/329

FOREIGN PATENT DOCUMENTS

| 0032198 | 7/1981 | European Pat. Off. | 224/331 |
| 5330386 | 12/1993 | Japan | 224/331 |
| 9014252 | 11/1990 | WIPO | 224/331 |

OTHER PUBLICATIONS

Rola International, Inc. blueprint drawing number RA1000 (Mar. 1990).

Rola, Inc., circa 1990–1991.

*Primary Examiner*—Linda J. Sholl
*Attorney, Agent, or Firm*—Lyon & Lyon LLP

[57] ABSTRACT

A two piece attachment clip for attaching a roof-mounted rack system to a vehicle. The attachment clip comprises a bottom portion that is attached to the weld seam flange of the vehicle, and a top portion that detachably locks into the bottom portion and engages a strap that holds the rack system onto the roof of the vehicle.

6 Claims, 1 Drawing Sheet

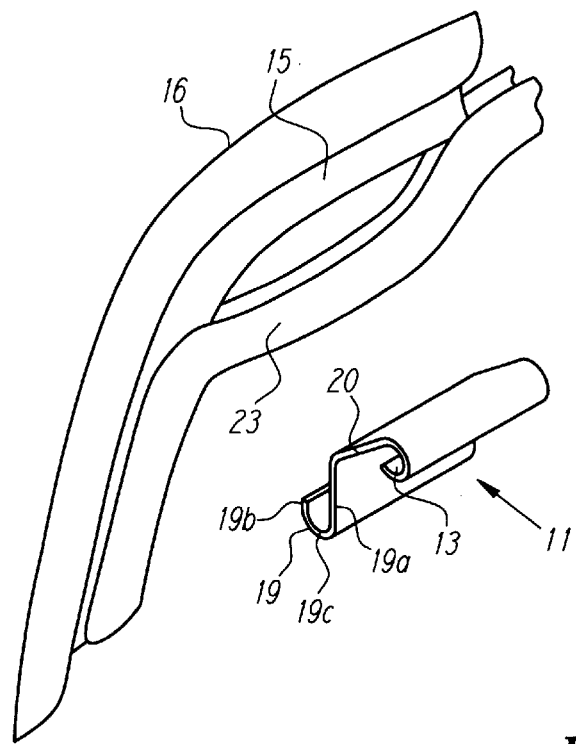
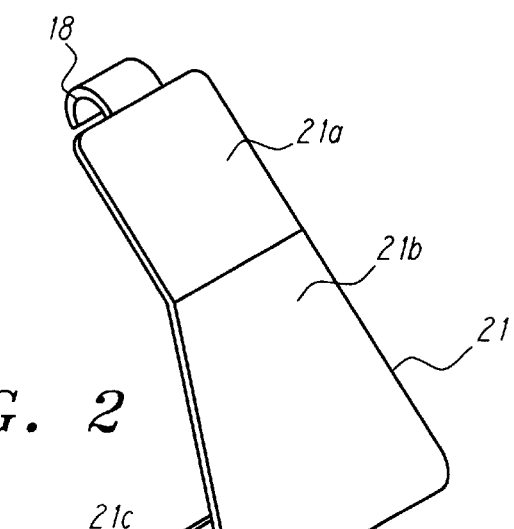
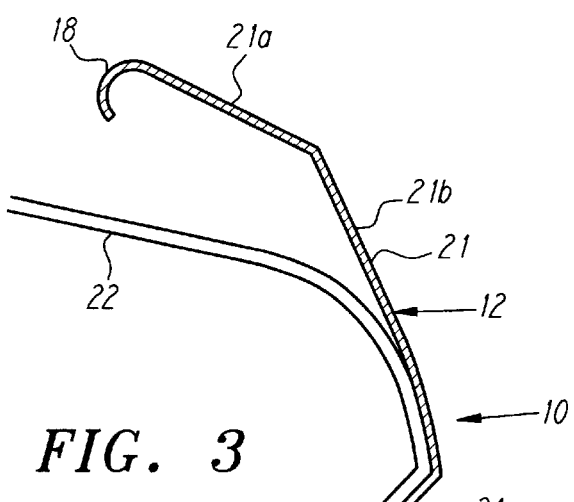
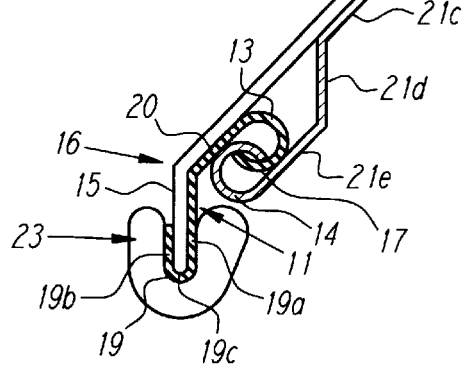
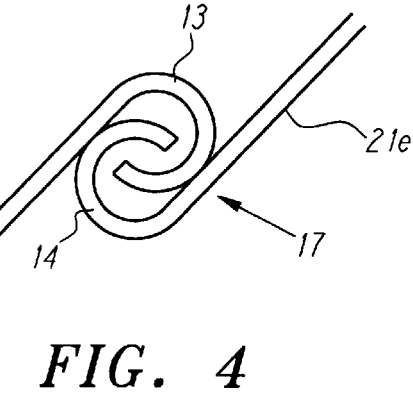
FIG. 1
FIG. 2
FIG. 3
FIG. 4

TWO PIECE CLIP

SPECIFICATION

1. Field of the Invention

The present invention relates generally to vehicle roof-mounted rack systems. More particularly, the present invention relates to a device and method for securing a vehicle roof-mounted rack system to the roof of a vehicle.

2. Background of the Invention

There are a number of devices available that are capable of carrying bicycles, surfboards, skis, or other items on the exterior of vehicles. One such device is a roof-mounted rack system. Roof-mounted rack systems typically comprise a square or rectangular rack made of aluminum, steel, or other durable material that is attached in some manner to the roof of a vehicle. The manner of attachment to the roof is typically by a strap, cable, or other similar device that is in some manner attached to a part of the vehicle.

The manner of attachment of roof-mounted rack systems to vehicles is a fundamental concern of the manufacturers of such devices. The manner of attachment is very much dependent on the styling of the vehicle being attached to, and particularly the structure of the door jamb, which is the part of the vehicle most frequently used as an anchor point for attaching roof-mounted rack systems. Because of the competitive nature of the automotive industry, door jambs of most types of automobiles have historically been designed in a similar manner. This has allowed rack manufacturers to design attachment mechanisms of a fairly uniform design, generally employing a one piece clip designed to hook onto the door jamb of the automobile. A strap is then attached at one end to the clip, and at its other end to the rack. Through attachment by the strap, the clip is able to hold the rack in place on the roof of the vehicle.

However, in recent years, automobile manufacturers have significantly changed the design of vehicle door jambs in a manner that reduces the manufacturing costs of the automobile. The newly designed jambs employ a relatively steeper angle than the traditional door jambs, creating an attachment problem for the traditional one piece clips used to hold the rack systems on the roof of the vehicle. Because of the relatively steeper angle of the new jamb design, the single piece clip tends to slide upward toward the rack system, eventually becoming detached from its location and releasing the rack from the roof of the vehicle.

Accordingly, it would be desirable to have an improved roof-mounted rack system attachment device which would overcome the shortcomings of the prior art attachment clips.

SUMMARY OF THE INVENTION

The attachment clip of the present invention provides a mechanism for attaching a roof-mounted rack system to the roof of a vehicle. In the preferred embodiment, the attachment clip comprises a two piece clip having a bottom portion that is attached to the weld seam of the vehicle, and a top portion that detachably locks into the bottom portion and engages the rack support end.

The bottom portion has a first engagement lip and the top portion has a second engagement lip. The first engagement lip and second engagement lip interlock to form a "pinless" hinge connecting the bottom portion to the top portion. The pinless hinge connecting the bottom portion to the top portion provides an attachment clip that has improved operational characteristics and is easier to use.

Accordingly, it is an object of the present invention to provide an improved attachment clip for attaching a roof-mounted rack system to the roof of a vehicle.

It is a further object of the present invention to provide a two piece attachment clip that overcomes the shortcomings of the prior art single piece attachment clips.

Further objects and advantages of the present invention will become apparent from a consideration of the drawings and ensuing description.

BRIEF DESCRIPTION OF THE DRAWINGS

FIG. 1 is a perspective view of a portion of a door jamb of a vehicle and a bottom portion of an attachment clip in accordance with the present invention.

FIG. 2 is a perspective view of a top portion of an attachment clip in accordance with the present invention.

FIG. 3 is a cross-sectional view of an attachment clip attached to a vehicle.

FIG. 4 is a detail cross-sectional view of a pinless hinge of the attachment clip of FIGS. 1–3.

DETAILED DESCRIPTION OF THE PREFERRED EMBODIMENT

Turning now to the drawings, an attachment clip 10 according to the present invention includes two portions and comprises a bottom portion 11 (see FIG. 1) detachably connected to a top portion 12 (see FIG. 2). In the preferred embodiment, the bottom portion 11 is connected to the top portion 12 by the interlocking of a first engagement lip 13 at one end of the bottom portion 11 with a second engagement lip 14 at one end of the top portion 12, as illustrated in FIG. 3. The assembled attachment clip 10 attaches to a weld seam flange 15 of a door jamb 16 of a vehicle, and is provided with an engagement tab 18 at the upper end of the top portion that provides an attachment area to which a strap (not shown) of a roof-mounted rack system (also not shown) is attachable. The attachment clip 10 preferably is formed of stainless steel, but may also be constructed of some other durable material such as, but not limited to, plastic, aluminum, or other metal or alloy.

Turning now to FIG. 1, the bottom portion 11 of the attachment clip 10 comprises a "J"-shaped weld seam hook 19 adapted to engage a weld seam flange 15 of a door jamb 16 of a vehicle. The weld seam hook 19 comprises a first parallel portion 19a parallel to and integrally formed with a second parallel portion 19b by a radius 19c. The first parallel portion 19a is longer than the second parallel portion 19b to thereby define the "J" shape of the weld seam hook 19. At the top end of the first parallel portion 19a of the weld seam hook 19 there is a flat extension 20 that extends upwardly and outwardly away from the weld seam hook 19, forming an obtuse angle with the first parallel portion 19a of the weld seam hook 19. The flat extension 20 terminates in the aforementioned first engagement lip 13 at the end of the flat extension 20 opposite the weld seam hook 19. The first engagement lip 13 is a curve forming a partial circle, or "C"-shape, in cross-section.

Turning now to FIG. 2, the top portion 12 of the attachment clip 10 comprises three integrally formed sections: a curved engagement tab 18, an extended body portion 21, and the second engagement lip 14. The curved engagement tab 18 is a half-circular shaped member integrally formed to one end of the body portion 21. The body portion 21 comprises five planar members, 21a–21e, integrally formed in order, each contiguous pair of planar members defining an obtuse angle between the two. For example, the first planar member 21a is integrally formed at one end to the engagement tab 18, and at a second end to the second planar member 21b, which is integrally formed at its other end to the third planar member 21c, and so on as illustrated in FIG. 3. The first planar member 21a and second planar member 21b define an obtuse angle between them, as does the second planar member 21b and third planar member 21c, and so on. The orientation of the planar members is such that the top portion 12 of the attachment clip 10 rests against a portion of the roof 22 of the vehicle to which the attachment clip 10 is attached. The first planar member 21a and second planar member 21b extend upwardly away from the roof 22 such that the engagement tab 18 is advantageously positioned for attachment to the rack system.

The second engagement lip 14 is connected to an end of the fifth planar member 21e, which comprises an end of the body portion 21. The second engagement lip 14 is of a shape similar to the first engagement lip 13, namely, a curve forming a partial circle, or "C"-shape, in cross-section.

Turning now to FIGS. 3 and 4, the interlocking first engagement lip 13 and second engagement lip 14 are in the form of a "pinless" hinge 17 when the top portion 12 and bottom portion 11 are attached to each other. The relative orientation of the first engagement lip 13 and second engagement lip 14 allows an amount of rotational movement by the top portion 12 and bottom portion 11 about an axis formed by the first engagement lip 13 and second engagement lip 14, but prevents the top portion 12 and bottom portion 11 from becoming disengaged from each other when the top portion 12 and bottom portion 11 are pushed toward or pulled away from each other. The "pinless" hinge 17 formed by the first engagement lip 13 and second engagement lip 14 further allows the bottom portion 11 to be detached from the top portion 12 by simply sliding one of the two portions away from the other, along the axis formed by the first engagement lip 13 and second engagement lip 14, until the first engagement lip 13 is no longer interlocking with the second engagement lip 14. Accordingly, the design of the interlocking first engagement lip 13 and second engagement lip 14 provides a mechanism for attaching the top portion 12 to the bottom portion 11 that allows side to side relative movement and a degree of rotational movement, but that prevents disengagement by pushing or pulling. This mechanism provides an improvement over the prior art both in operability and in ease of use.

The manner of use of the attachment clip 10 will now be described with reference to FIG. 3. As discussed above, the "J"-shaped weld seam hook 19 is adapted to engage the weld seam flange 15 of the door jamb 16 of the vehicle to thereby hold the bottom portion 11 of the attachment clip 10 in place on the vehicle. The weld seam hook 19 is placed on the weld seam flange 15 by first pulling a section of the weatherstrip 23 away from the weld seam flange 15 and then placing the bottom portion 11 of the attachment clip 10 onto the weld seam flange 15. The weatherstrip 23 is then replaced, where it holds the bottom portion 11 of the attachment clip 10 in place. Once the bottom portion 11 is in place, the top portion 12 is attached to the bottom portion 11 by sliding the second engagement lip 14 into the first engagement lip 13 from the side. Because of the partial-circular, or "C"-shaped, cross-section of the first engagement lip 13 and second engagement lip 14, the two engagement lips are able to be engaged and disengaged by the above-described sideways sliding, but the two engagement lips are unable to be disengaged by simply pulling or pushing the top portion 12 toward or away from the bottom portion 11, or by rotating one of the top portion 12 or bottom portion 11 around the other. This can best be seen with reference to FIG. 4.

Once the top portion 12 and bottom portion 11 of the attachment clip 10 are in place, the engagement tab 18 is advantageously positioned relative to the vehicle roof 22 and the roof-mounted rack system to allow a cable or strap of the rack system to be attached to the engagement tab 18. The engagement tab 18 is curved in a downward direction toward the vehicle roof 22 surface, allowing the engagement tab 18 to "bite" into the rack system mounting strap. This downward curve of the engagement tab 18 causes the attachment clip 10 to remain engaged to the rack system mounting strap. However, in the unlikely event that the attachment clip 10 were to become disengaged from the rack system, the engagement tab 18 acts as a "hook" to grab at the mounting strap every time upward motion is exerted by the rack system to thereby pull the rack system back down toward the roof 22.

The two piece design of the attachment clip 10 provides a further advantage in that once the bottom portion 11 of the attachment clip 10 is installed on the weld seam flange 15 of the vehicle, it need not be removed from the vehicle even if the rack system is removed. This eliminates the need to measure the rack location each time the rack is installed on the vehicle, as is commonly done with racks that utilize single piece attachment clips. With the two piece attachment clip 10, to install the rack system the user need only locate the previously installed bottom portion 11, slide the top portion 12 onto the bottom portion 11, and attach the rack system to the engagement tab 18. The rack may be easily removed by simply reversing the procedure.

While the above description contains many specificities, these should not be construed as limitations on the scope of the invention, but rather as an exemplification of preferred embodiments thereof. Other variations are possible.

Accordingly, the scope of the present invention should be determined not by the embodiments illustrated above, but by the appended claims and their legal equivalents.

What is claimed is:

1. An attachment clip comprising:
   a bottom portion adapted to attach to a door jamb of a vehicle, said bottom portion having a first c-shaped engagement lip, and
   a top portion having an attachment area at a first end adapted to engage a roof-mounted rack system, and a second c-shaped engagement lip at a second end,
   wherein said first engagement lip slidably interlocks said second engagement lip such that said top portion is detachably attached to said bottom portion, said first engagement lip and said second engagement lip define a pinless hinge having a pivot axis and said first and second engagement lips are shaped to interlock with each other to prevent their connection or removal with each other except in a sliding direction parallel to said pivot axis.

2. The attachment clip of claim 1 wherein said bottom portion comprises a hook adapted to engage a weld seam of a door jamb of a vehicle.

3. A two piece attachment clip for attaching a roof-mounted rack system to the roof of a vehicle comprising:

a bottom portion adapted to engage a weld seam of a door jamb of a vehicle and having a first c-shaped engagement lip, and a top portion adapted to engage the roof-mounted rack system and having a second c-shaped engagement lip, wherein said first engagement lip and said second engagement lip define a hinge having a pivot axis and connecting said bottom portion to said top portion, said first and second c-shaped engagement lips being shaped to interlock with each other to prevent their connection or removal with each other except in a sliding direction parallel to said pivot axis.

4. The attachment clip of claim 3 wherein said top portion has an engagement tab providing an attachment area.

5. The attachment clip of claim 3 wherein said first engagement lip and said second engagement lip define a pinless hinge.

6. The attachment clip of claim 5 wherein said top portion is detachable from said bottom portion by sliding said top portion away from said bottom portion.

* * * * *